United States Patent
Asanuma

(10) Patent No.: US 7,509,801 B2
(45) Date of Patent: Mar. 31, 2009

(54) EXHAUST GAS CONTROL APPARATUS FOR INTERNAL COMBUSTION ENGINE

(75) Inventor: Takamitsu Asanuma, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 318 days.

(21) Appl. No.: 10/560,733

(22) PCT Filed: Jun. 6, 2005

(86) PCT No.: PCT/IB2005/001606

§ 371 (c)(1),
(2), (4) Date: Dec. 15, 2005

(87) PCT Pub. No.: WO2005/121515

PCT Pub. Date: Dec. 22, 2005

(65) Prior Publication Data

US 2007/0089405 A1    Apr. 26, 2007

(30) Foreign Application Priority Data

Jun. 10, 2004    (JP)    ............................. 2004-172748

(51) Int. Cl.
*F01N 3/00*    (2006.01)
(52) U.S. Cl. .............................. 60/295; 60/274; 60/278; 60/285
(58) Field of Classification Search .................... 60/285, 60/295, 274, 278, 297, 300
See application file for complete search history.

(56) References Cited

U.S. PATENT DOCUMENTS

| | | | | |
|---|---|---|---|---|
| 6,145,303 A * | 11/2000 | Strehlau et al. | ................ | 60/274 |
| 6,530,216 B2 * | 3/2003 | Pott | ............................ | 60/295 |
| 6,574,955 B2 * | 6/2003 | Schroder et al. | .............. | 60/295 |
| 6,637,198 B2 * | 10/2003 | Hertzberg | ..................... | 60/295 |
| 6,854,266 B2 * | 2/2005 | Schnaibel et al. | ............. | 60/295 |
| 6,922,988 B2 * | 8/2005 | Yamaguchi et al. | ........... | 60/286 |
| 7,104,045 B2 * | 9/2006 | Elwart et al. | ................... | 60/285 |
| 7,111,451 B2 * | 9/2006 | Dou et al. | ...................... | 60/285 |
| 7,134,274 B2 * | 11/2006 | Asanuma | ...................... | 60/295 |
| 7,165,394 B2 * | 1/2007 | Toshioka et al. | .............. | 60/295 |
| 2001/0039798 A1 | 11/2001 | Pott | | |
| 2006/0191257 A1 * | 8/2006 | Goralski et al. | ............... | 60/295 |

(Continued)

FOREIGN PATENT DOCUMENTS

DE    100 23 791 A1    12/2001

(Continued)

*Primary Examiner*—Tu M Nguyen
(74) *Attorney, Agent, or Firm*—Oliff & Berridge, PLC

(57) ABSTRACT

There are provided a NOx storage reduction catalyst which is provided in an exhaust passage for an engine, and a sulfur concentration sensor which can detect a total concentration of SOx and $H_2S$ in exhaust gas that has passed through the NOx catalyst, and a concentration of SOx in the exhaust gas. An operating state of the engine is controlled such that SOx is released from the NOx catalyst (sulfur poisoning recovery process). When a concentration of the hydrogen sulfide obtained based on the total concentration and the concentration of SOx that are detected by the sulfur concentration sensor during the sulfur poisoning recovery process exceeds a permissible limit, an operating state of the engine is controlled such that the sulfur oxide is released from the NOx catalyst, an amount of the released sulfur oxide is in a predetermined range, and the concentration of the hydrogen sulfide is reduced.

8 Claims, 10 Drawing Sheets

U.S. PATENT DOCUMENTS

2006/0230749 A1 * 10/2006 Asanuma .................. 60/295

FOREIGN PATENT DOCUMENTS

| JP | U 2-88169 | 7/1990 |
| JP | A 2000-45753 | 2/2000 |
| JP | A 2000-230419 | 8/2000 |
| JP | A 2000-274232 | 10/2000 |
| JP | A 2001-3782 | 1/2001 |
| JP | A 2001-82137 | 3/2001 |
| JP | A 2001-303937 | 10/2001 |
| JP | A 2003-35132 | 2/2003 |
| JP | B2 3480431 | 10/2003 |
| JP | A 2004-108176 | 4/2004 |

* cited by examiner

EXHAUST GAS CONTROL APPARATUS FOR INTERNAL COMBUSTION ENGINE

BACKGROUND OF THE INVENTION

1. Field of the Invention

The invention relates to an exhaust gas control apparatus for an internal combustion engine, in which a NOx storage reduction catalyst is recovered from poisoning caused by a sulfur component.

2. Description of the Related Art

A NOx storage reduction catalyst (hereinafter, the NOx storage reduction catalyst may be referred to as "NOx catalyst") is provided in an exhaust passage. The NOx catalyst may be poisoned with sulfur oxide (SOx) (i.e., sulfur poisoning may occur). In this case, it is necessary to recover the NOx catalyst from sulfur poisoning so that a catalyst control function is restored. Therefore, a sulfur poisoning recovery process is performed at given time intervals. In the sulfur poisoning recovery process, a temperature of the NOx catalyst is increased to a temperature range in which SOx is released (hereinafter, referred to as "SOx release temperature range"), and the NOx catalyst is brought into a reducing atmosphere. For example, Japanese Patent Application Publication No. JP (A) 2000-045753 discloses an exhaust gas control apparatus in which an accumulated amount of SOx in a NOx catalyst is calculated based on a concentration of SOx that is detected by a SOx sensor provided at a portion downstream of the NOx catalyst; and when the accumulated amount exceeds a predetermined limit, a temperature of the NOx catalyst is increased to a SOx release temperature range (i.e., the temperature range of approximately 600° C. or higher), and an air-fuel ratio of exhaust gas (hereinafter, referred to as "exhaust gas air-fuel ratio") is made rich for a predetermined time period so that the NOx catalyst is recovered from sulfur poisoning.

Also, in the sulfur poisoning recovery process, SOx released from the NOx catalyst reacts with hydrocarbon (HC) and carbon monoxide (CO), and thus hydrogen sulfide ($H_2S$) is generated. Since $H_2S$ causes sulfur odor, an amount of released $H_2S$ needs to be reduced. Accordingly, Japanese Patent Application Publication No. JP (A) 2003-035132 discloses an exhaust gas control apparatus in which a sensor for detecting a concentration of $H_2S$ is disposed at a portion downstream of the NOx storage reduction catalyst, and the sulfur poisoning recovery process is controlled based on an output value of the sensor.

However, in the exhaust gas control apparatus using the SOx sensor disclosed in the Japanese Patent Application Publication No. JP (A) 2000-045753, since the amount of released SOx is not detected during the sulfur poisoning recovery process, the sulfur poisoning recovery process may be continued even when almost no SOx is released from the NOx catalyst, or the sulfur poisoning recovery process may be excessively performed and the amount of released $H_2S$ may not be reduced. In the exhaust gas control apparatus using the $H_2S$ sensor disclosed in the Japanese Patent Application Publication No. JP (A) 2003-035132, though generation of $H_2S$ is suppressed, the actual amount of released SOx cannot be detected during the sulfur poisoning recover process, as in the exhaust gas control apparatus disclosed in the Japanese Patent Application Publication No. JP (A) 2000-045753. Therefore, the sulfur poisoning recovery process may be continued while SOx is not sufficiently released. That is, a condition on which SOx is released from the NOx catalyst does not necessarily match a condition on which $H_2S$ is generated. Accordingly, when the sulfur poisoning recovery process is performed based on only the concentration of $H_2S$, the sulfur poisoning recovery process may not appropriately proceed.

SUMMARY OF THE INVENTION

Accordingly, it is an object of the invention to provide an exhaust gas control apparatus for an internal combustion engine, in which sulfur oxide (SOx) can be reliably released while suppressing release of hydrogen sulfide ($H_2S$) during a sulfur poisoning recovery process.

A first aspect of the invention relates to an exhaust gas control apparatus for an internal combustion engine, which includes a NOx storage reduction catalyst which is provided in an exhaust passage for an internal combustion engine; detection means which detects a total concentration of sulfur oxide and hydrogen sulfide in exhaust gas that has passed through the NOx storage reduction catalyst, and a concentration of the sulfur oxide in the exhaust gas; and poisoning recovery control means which performs a sulfur poisoning recovery process that controls an operating state of the internal combustion engine such that the sulfur oxide is released from the NOx storage reduction catalyst. When a concentration of the hydrogen sulfide obtained based on the total concentration and the concentration of the sulfur oxide that are detected by the detection means during the sulfur poisoning recovery process exceeds a permissible limit, the poisoning recovery control means controls the operating state of the internal combustion engine such that the sulfur oxide is released from the NOx storage reduction catalyst, an amount of the released sulfur oxide is in a predetermined range, and a concentration of the hydrogen sulfide is reduced.

In the first aspect of the invention, since the detection means detects the concentration of the sulfur oxide at a portion downstream of the NOx storage reduction catalyst, and the total concentration of the sulfur oxide and the hydrogen sulfide, the concentration of the sulfur oxide that is actually released can be obtained, and the concentration of the hydrogen sulfide that is actually generated can be also obtained based on the total concentration and the concentration of the sulfur oxide. Referring to the concentration of the sulfur oxide and the concentration of the hydrogen sulfide, the operating state of the internal combustion engine is controlled such that the sulfur oxide is released while the concentration of the hydrogen sulfide is reduced to be in the permissible range. That is, the operating state of the internal combustion engine is controlled such that the sulfur oxide is released from the NOx storage reduction catalyst, the amount of the released sulfur oxide is in a predetermined range, and the concentration of the hydrogen sulfide is reduced. Thus, recovery of the catalyst function can be caused to proceed reliably by releasing the sulfur oxide while suppressing occurrence of sulfur odor caused by the hydrogen sulfide.

In the first aspect of the invention, the poisoning recovery control means may control the operating state of the internal combustion engine such that the concentration of the hydrogen sulfide is reduced, by performing at least one of a process of increasing an exhaust gas air-fuel ratio in a rich air-fuel ratio range, and a process of decreasing a temperature of the NOx storage reduction catalyst in a temperature range in which the sulfur oxide is released. By controlling the operating state in this manner, it is possible to suppress generation of the hydrogen sulfide caused by the sulfur oxide released from the NOx storage reduction catalyst.

The poisoning recovery control means may increase the exhaust gas air-fuel ratio, for example, by performing a process of increasing an amount of intake air, a process of decreasing an EGR amount, or a process of decreasing an amount of fuel supplied to a portion upstream of the NOx storage reduction catalyst (a cylinder or an exhaust passage).

In the first aspect of the invention, when the concentration of the hydrogen sulfide is lower than the permissible limit, the poisoning recovery control means may control the operating state of the internal combustion engine such that the amount of the sulfur oxide released from the NOx storage reduction catalyst is increased. Since the operating state is controlled in this manner, the sulfur poisoning recovery process can be caused to proceed efficiently by promoting release of the sulfur oxide as much as possible while the concentration of the hydrogen sulfide does not exceed the permissible limit.

The poisoning recovery control means may control the operating state of the internal combustion engine such that the amount of the released sulfur oxide is increased, by performing at least one of a process of decreasing an exhaust gas air-fuel ratio, and a process of increasing a temperature of the NOx storage reduction catalyst. By controlling the operating state in this manner, it is possible to increase the amount of the sulfur oxide released from the NOx reduction storage catalyst.

The poisoning recovery control means may decrease the exhaust gas air-fuel ratio, for example, by performing a process of decreasing an amount of intake air, a process of increasing an EGR amount, or a process of increasing an amount of fuel supplied to a portion upstream of the NOx storage reduction catalyst (a cylinder or an exhaust passage), as in a manner opposite to the manner in which the exhaust gas air-fuel ratio is increased.

In the first aspect of the invention, when the concentration of the sulfur oxide detected by the detection means has decreased to a predetermined lower limit value, the poisoning recovery control means may control the operating state of the internal combustion engine such that the amount of the released sulfur oxide is increased. By controlling the operating state in this manner, the sulfur poisoning recovery process can be caused to proceed more reliably based on the detected concentration of the sulfur oxide that is actually released from the NOx storage reduction catalyst.

As has been described so far, the exhaust gas control apparatus according to the first aspect of the invention includes the detection means for detecting the concentration of the sulfur oxide at a portion downstream of the NOx storage reduction catalyst, and the total concentration of the sulfur oxide and the hydrogen sulfide. Therefore, the concentration of the sulfur oxide that is actually released during the sulfur poisoning recovery process can be obtained, and the concentration of the hydrogen sulfide that is actually generated can be also obtained based on the total concentration and the concentration of the sulfur oxide. On the basis of these concentrations, an exhaust system can be controlled such that the sulfur oxide is released while the concentration of the hydrogen sulfide is reduced to be in the permissible range. Thus, recovery of the catalyst function can be caused to proceed reliably by releasing the sulfur oxide while suppressing occurrence of sulfur odor caused by the hydrogen sulfide.

BRIEF DESCRIPTION OF THE DRAWINGS

The foregoing and/or further objects, features and advantages of the invention will become more apparent from the following description of exemplary embodiment with reference to the accompanying drawings, in which like numerals are used to represent like elements and wherein:

FIG. 10A shows time-dependent changes in the temperature of the catalyst, the exhaust gas air-fuel ratio, the amount of released SOx, and the amount of generated $H_2S$ in a case where the controls shown in FIG. 7 and in FIG. 8 are performed, and FIG. 10B shows time-dependent changes in the amount of released SOx and the amount of generated $H_2S$ in a comparative example.

DETAILED DESCRIPTION OF THE PREFERRED EMBODIMENTS

Figure 1:
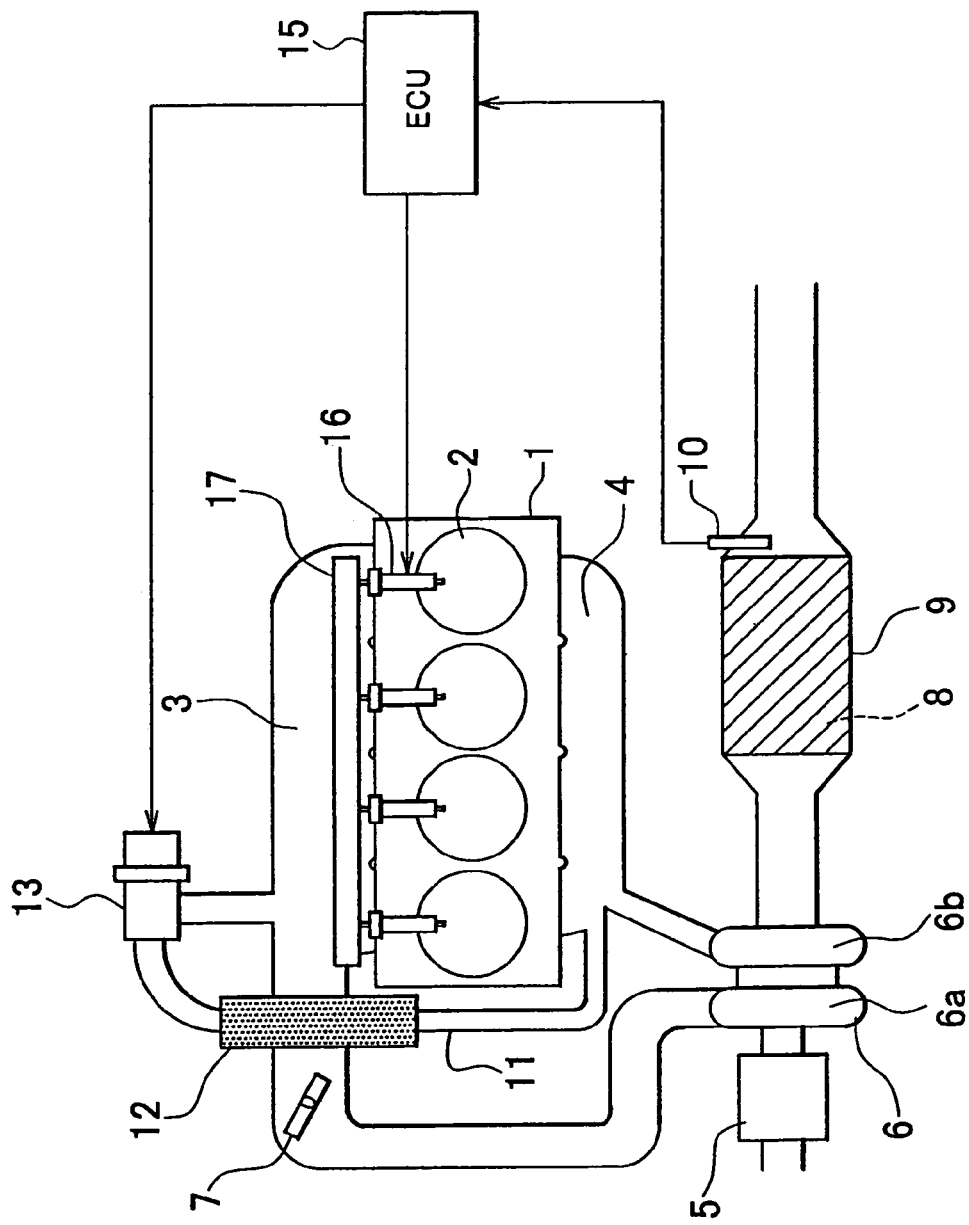
FIG. 1 is a diagram showing a configuration of an internal combustion engine to which the invention is applied.

FIG. 1 shows a diesel engine 1 as an internal combustion engine, and an intake and exhaust systems therefor. The engine 1 is installed in a vehicle as a power source for running. An intake passage 3 and an exhaust passage 4 are connected to cylinders 2 of the engine 1. An air filter 5 for filtering intake air, a compressor 6a of a turbo charger 6, and a throttle valve 7 for adjusting an amount of intake air are provided in the intake passage 3. A turbine 6b of the turbo charger 6 is provided in the exhaust passage 4. An exhaust gas control unit 9 including a NOx storage reduction catalyst (hereinafter, referred to as "NOx catalyst") 8 is provided at a portion downstream of the turbine 6b in the exhaust passage 4. A sulfur concentration sensor 10 serving as concentration detection means for detecting a concentration of a sulfur component in exhaust gas is provided at a portion downstream of the catalyst 8. The exhaust gas control unit 9 may have a structure in which NOx catalytic material is supported by a diesel particulate filter for capturing particulate matter in exhaust gas. Also, the exhaust gas control unit 9 may be provided separately from such a filter. The NOx storage reduction catalyst is a catalyst which can retain NOx. It is to be understood that the term "storage" used herein means retention of NOx in the form of at least one of adsorption, adhesion, absorption, trapping, occlusion, and others. Also, sulfur poisoning may occur in any manner. Further, NOx and SOx may be released in any manner. The exhaust passage 4 is connected to the intake passage 3 through an EGR passage 11. An EGR cooler 12 and an EGR valve 13 are provided in the EGR passage 11.

An air-fuel ratio at a portion where the NOx catalyst 8 is fitted (hereinafter, the air-fuel ratio may be referred to as "exhaust gas air-fuel ratio"), and a temperature of the NOx catalyst 8 are controlled by an engine control unit (ECU) 15. The ECU 15 is a known computer unit which controls an operating state of the engine 1 by operating various devices such as the fuel injection valve 16 which injects fuel to the cylinder 2, a pressure adjustment valve for a common rail 17 which accumulates pressure of fuel supplied to the fuel injection valve 16, the throttle valve 7 for adjusting the amount of intake air, and the EGR valve 13. The ECU 15 controls fuel injection operation of the fuel injection valve 16 so that an air-fuel ratio, which is a ratio between mass of air taken in the cylinder 2 and mass of fuel supplied from the fuel injection valve 16, is controlled to a predetermined target air-fuel ratio. During normal operation, the target air-fuel ratio is controlled to be a lean air-fuel ratio at which an air amount is larger than an air amount at a stoichiometric air fuel ratio. However, when NOx and SOx are released from the NOx catalyst 8, the exhaust gas air-fuel ratio is controlled to the stoichiometric air-fuel ratio, or a rich air-fuel ratio at which a fuel amount is larger than a fuel amount at the stoichiometric air fuel ratio. Also, since the ECU 15 performs routines shown in FIG. 6 to FIG. 9 described later, the ECU 15 functions as poisoning recovery control means. The ECU 15 controls other various devices, which are not shown in FIG. 1. Also, in order to perform the aforementioned various controls, the engine 1 is provided with various sensors such as an exhaust gas temperature sensor and an air-fuel ratio sensor, which are not shown in FIG. 1.

Figure 2:
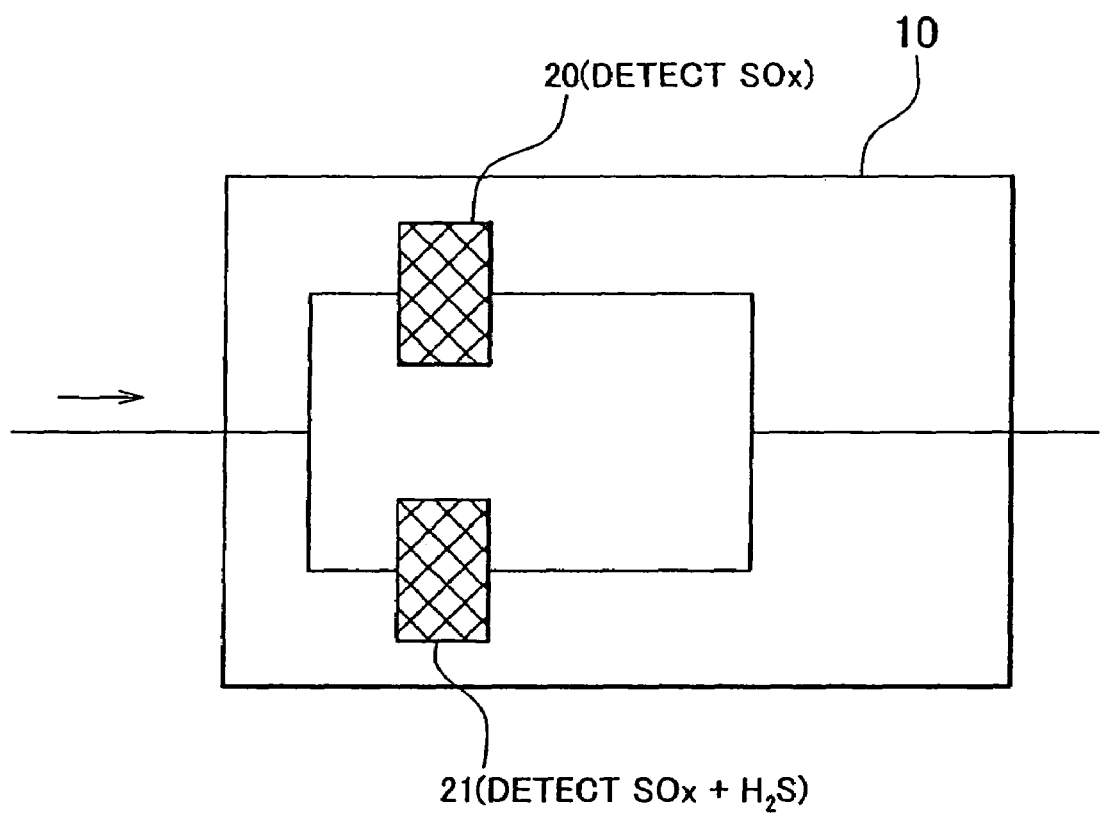
FIG. 2 is a diagram showing an outline of a configuration of a sulfur concentration sensor used in an exhaust gas control apparatus shown in FIG. 1.
Figure 3A:
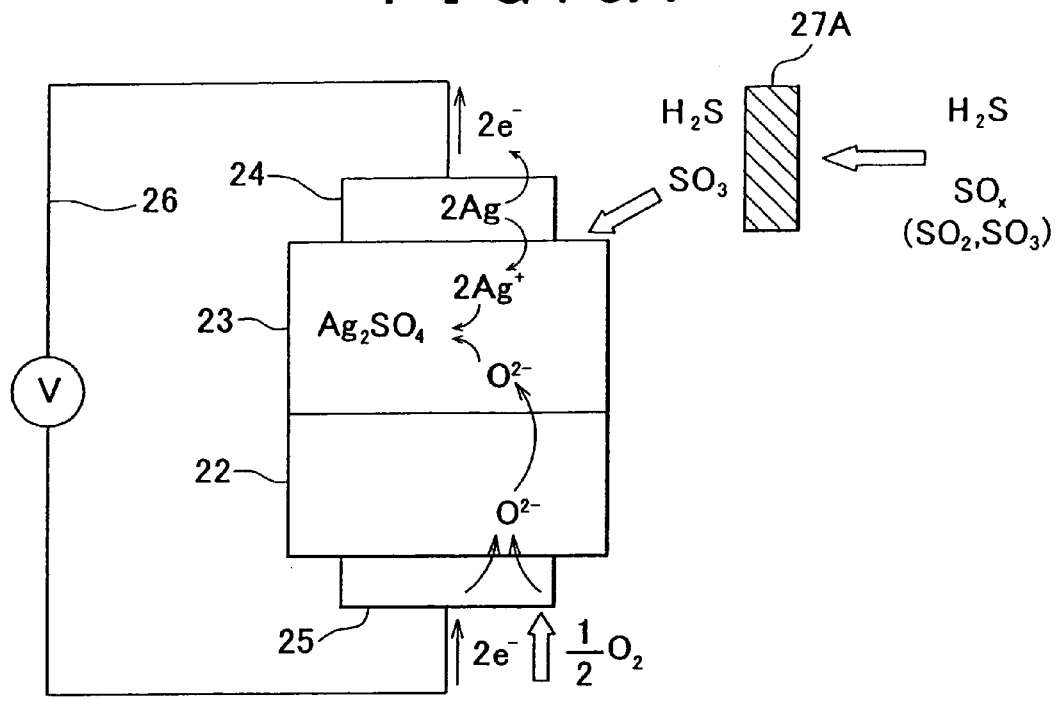
FIG. 3A shows a principle of detection in a SOx concentration detection portion of the sulfur concentration sensor.
Figure 3B:
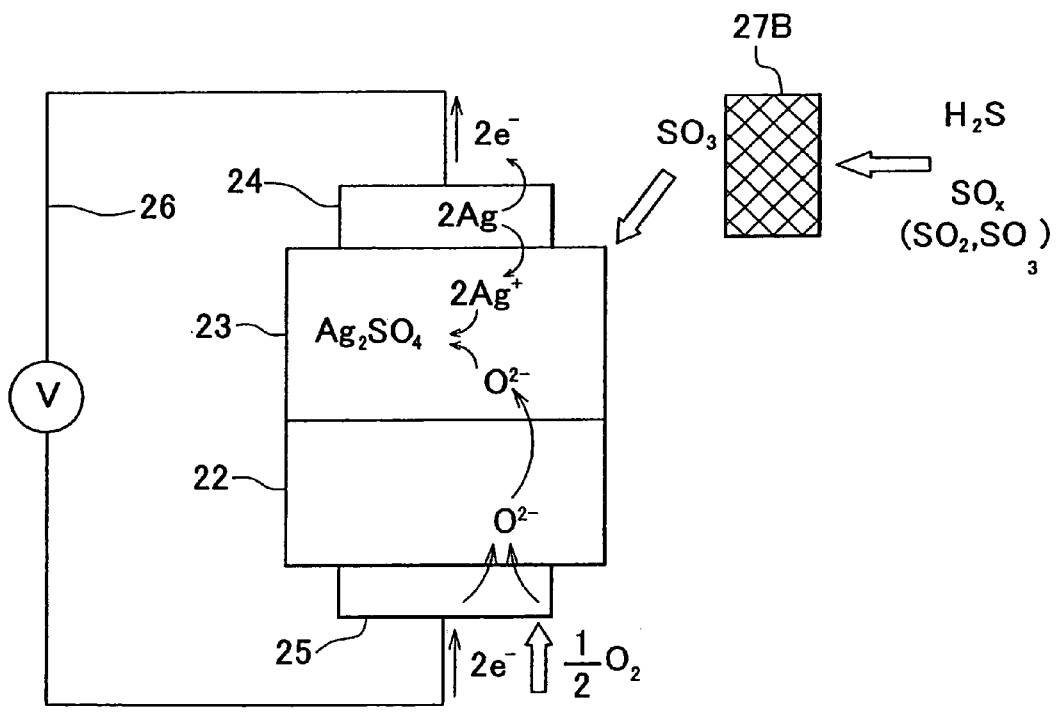
FIG. 3B shows a principle of detection in a total concentration detection portion of the sulfur concentration sensor.

Next, an example of the sulfur concentration sensor 10 will be described with reference to FIG. 2 and FIGS. 3A and 3B. As shown in FIG. 2, the sulfur concentration sensor 10 includes a SOx concentration detection portion 20 which detects a concentration of SOx in exhaust gas, and a total concentration detection portion 21 which detects a total concentration of SOx and $H_2S$ in the exhaust gas. FIG. 3A shows a principle of detection in the SOx concentration detection portion 20. FIG. 3B shows a principle of detection in the total concentration detection portion 21. As shown in FIG. 3A, in the SOx concentration detection portion 20, a sub-electrode 23 and a detection electrode 24 are provided on one surface of an oxygen ion conductor 22, and a reference electrode 25 is provided on the other surface of the oxygen ion conductor 22. For example, the oxygen ion conductor 22 is made using yttria stabilized zirconia, the sub-electrode 23 is made using sulfate, the detection electrode 24 is made using silver (Ag), and the reference electrode 25 is made using platinum (Pt). As the sulfate used for making the sub-electrode 23, mixed salt of silver sulfate ($Ag_2SO_4$) and barium sulfate ($BaSO_4$) is preferably employed. The silver sulfate is responsible for a responsive reaction in the sub-electrode 23. In order to stabilize the silver sulfate, the barium sulfate is added. Also, metallic silver is responsible for a responsive reaction in the detection electrode 24. In order to improve strength of the electrode, silver-plated platinum is preferably used.

The principle of detection in the SOx concentration detection portion 20 is as follows. First, most part of sulfur oxide (SOx; however, most part of the sulfur oxide is sulfur dioxide ($SO_2$)) guided to the SOx concentration detection portion 20 is oxidized to sulfur trioxide ($SO_3$) by an oxidation catalyst 27A. The sulfur trioxide ($SO_3$) reacts with the metallic silver of the detection electrode 24, and electrons are released from the metallic silver. Then, remaining silver ions ($Ag^+$) move to the sub-electrode 23. The electrons released from the detection electrode 24 are guided to the reference electrode 25 through an external circuit. At the reference electrode 25, the electrons is combined with oxygen ($O_2$), and oxygen ions ($O^{2-}$) are generated. The oxygen ions pass through the oxygen ion conductor 22 to reach the sub-electrode 23. In the sub-electrode 23, the silver ions and the oxygen ions react with $SO_3$, and thus silver sulfide is generated. Due to the reactions that have been described, electromotive force is generated between the detection electrode 24 and the reference electrode 25 according to the concentration of SOx, on the condition that partial pressure of oxygen is constant. By measuring the electromotive force, the concentration of SOx can be detected. Note that the oxidation catalyst 27A has low oxidizing ability, and therefore most part of $H_2S$ passes through the catalyst 27A without being oxidized. Accordingly, the electromotive force in the SOx concentration detection portion 20 does not reflect the concentration of $H_2S$.

As shown in FIG. 3B, the total concentration detection portion 21 includes an oxidation catalyst 27B which has oxidation catalytic activity for $H_2S$, and has high oxidizing ability, instead of the catalyst 27A having low oxidizing ability. Other portions of the configuration of the total concentration detection portion 21 are the same as those of the configuration of the SOx concentration detection portion 20. That is, in the oxidation catalyst 27B, $SO_2$ and $H_2S$ are changed to $SO_3$, and the generated $SO_3$ and $SO_3$ present in the exhaust gas cause the reactions in the sub-electrode 23 and the detection electrode 24. Due to the reaction in each of the electrodes 23 and 24, electromotive force is generated between the electrodes 24 and 25 according to the total concentration of SOx and $H_2S$ in the exhaust gas in the total concentration detection portion 21. The total concentration detection portion 21 is different from the SOx concentration detection portion 20 in this point. The sulfur concentration sensor 10 can detect the concentration of $H_2S$ in the exhaust gas, by detecting a difference between the electromotive force detected by the SOx concentration detection portion 20 and the electromotive force detected by the total concentration detection portion 21. The oxidizing ability of the oxidation catalyst 27A and the oxidizing ability of the oxidation catalyst 27B can be made different from each other, for example, by making density of platinum used as the catalytic material in the catalyst 27A different from that in the catalyst 27B, making capacity of the catalyst 27A different from that of catalyst 27B, or making the catalytic material in the catalyst 27A different from that in the catalyst 27B. That is, the density of Pt in the catalyst 27A having low oxidizing ability may be set to be low (i.e., an amount of supported Pt in the catalyst 27A may be set to be small), and the density of Pt in the catalyst 27B having high oxidizing ability may be set to be high (the amount of supported Pt in the catalyst 27B may be set to be large). The capacity of the catalyst 27A may be set to be small, and the capacity of the catalyst 27B may be set to be large while the density of Pt in the catalyst 27A and the density of Pt in the catalyst 27B are set to be equal to each other. Also, catalytic material having low oxidizing ability (for example, palladium (Pd)) may be used in the catalyst 27A, and catalytic material having high oxidizing ability (for example, Pt) may be used in the catalyst 27B. The oxidizing ability of the catalyst 27A and the oxidizing ability of the catalyst 27B may be made different from each other also by controlling a temperature of the catalyst 27A having low oxidizing ability to a value lower than a temperature of the catalyst 27B having high oxidizing ability. Further, the oxidizing ability of the catalyst 27A and the oxidizing ability of the catalyst 27B may be made different from each other by appropriately combining these methods. In the sulfur concentration sensor 10, oxygen is used for detecting the concentration of SOx and the total concentration. Accordingly, air (fresh air) containing oxygen of an amount required for causing the reaction may be supplied to each of the detection portions 20 and 21 so that the concentration of SOx and the total concentration can be reliably detected even during the sulfur poisoning recovery process during which the exhaust gas air-fuel ratio is controlled to be in the rich range. As the oxidation catalyst 27B, an electrode having oxidation catalytic activity for $H_2S$ may be used. Further, the sulfur concentration sensor 10 may include temperature control means for maintaining the temperature thereof in a predetermined reaction range, such as a heater.

Figure 4:
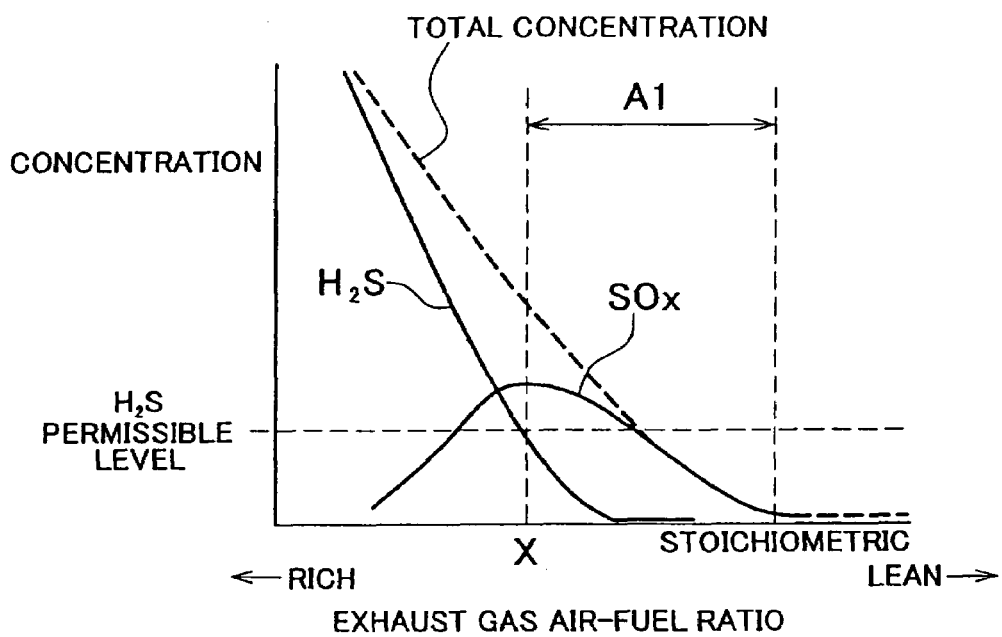
FIG. 4 is a graph showing an example of a corresponding relationship between a concentration of SOx and a total concentration that are detected by the sulfur concentration sensor and a concentration of $H_2S$ obtained based on these concentrations, and an exhaust gas air-fuel ratio.

Next, referring to FIG. 4, description will be made of an outline of a control of the exhaust gas air-fuel ratio, which is performed by the ECU 15 during the sulfur poisoning recovery process. FIG. 4 is a graph showing an example of a corresponding relationship between the concentration of SOx and the total concentration that are detected by the sulfur concentration sensor 10 during the sulfur poisoning recovery process and the concentration of $H_2S$ obtained based on these concentrations, and the exhaust gas air-fuel ratio. When the exhaust gas air-fuel ratio is changed from the stoichiometric air-fuel ratio to a rich air-fuel ratio, the concentration of SOx is increased immediately. However, after the concentration of SOx reaches a peak at an air-fuel ratio X, the concentration of SOx is reduced as the exhaust gas air-fuel ratio becomes richer (i.e., as the exhaust gas air-fuel ratio is further decreased). Meanwhile, as the exhaust gas air-fuel ratio becomes richer (i.e., as the exhaust gas air-fuel ratio is decreased from the stoichiometric air-fuel ratio), the total concentration is uniformly increased, as shown by a dashed line. The concentration of $H_2S$ is equivalent to a difference between these concentrations. The concentration of $H_2S$ is not detected when the exhaust gas air-fuel ratio is controlled to a value in the vicinity of the stoichiometric air-fuel ratio. The concentration of $H_2S$ starts to be detected at an air-fuel ratio in the vicinity of the air-fuel ratio X at which the concentration of SOx reaches the peak. Then, as the exhaust gas air-fuel ratio becomes richer (i.e., as the exhaust gas is further decreased), the concentration of $H_2S$ is gradually increased. The amount of SOx released from the NOx catalyst 8 is increased as the exhaust gas air-fuel ratio becomes richer. However, when the exhaust gas air-fuel ratio becomes richer than a certain level, the detected value of the concentration of SOx is reduced. Therefore, it becomes noticeable that SOx reacts with HC and CO, and $H_2S$ is generated. In this embodiment, a permissible level of the concentration of $H_2S$ is set in order to prevent occurrence of sulfur odor, or the like. The ECU 15 controls the operating state of the engine 1 such that the sulfur poisoning recovery process is performed in a range A1 of the exhaust gas air-fuel ratio in which the sulfur concentration sensor 10 detects SOx, and the concentration of $H_2S$ becomes equal to or lower than the permissible level. Due to this control, the sulfur poisoning recovery process can be caused to proceed reliably by releasing SOx from the NOx catalyst 8 while suppressing occurrence of sulfur odor caused by $H_2S$.

Figure 5:
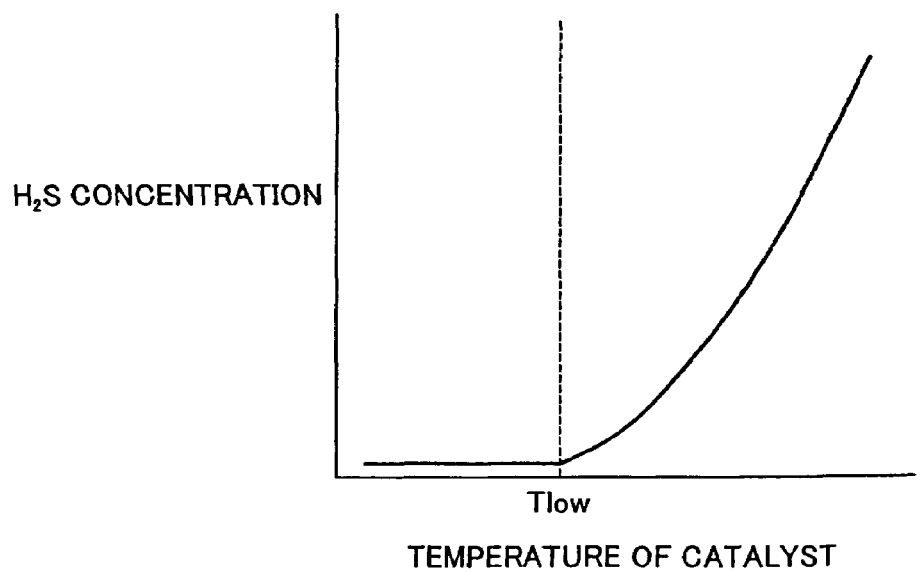
FIG. 5 is a graph showing an example of a corresponding relationship between a temperature of a NOx catalyst and the concentration of $H_2S$.

As shown in FIG. 5, the concentration of $H_2S$ generated during the sulfur poisoning recovery process is correlated with the temperature of the NOx catalyst 8. On the assumption that the exhaust gas air-fuel ratio is constant, when the temperature of the catalyst exceeds a lower limit temperature Tlow (for example, approximately 600° C.), $H_2S$ starts to be generated. Then, as the temperature of the catalyst is increased, the concentration of $H_2S$ is increased. Accordingly, the concentration of $H_2S$ can be reduced to be equal to or lower than the permissible level shown in FIG. 4 by controlling the temperature of the NOx catalyst 8. That is, in a case where the concentration of $H_2S$ is likely to exceed the permissible level during the sulfur poisoning recovery process, the concentration of $H_2S$ can be reduced to be equal to or lower than the permissible level by controlling the operating state of the engine 1 so that the temperature of the NOx catalyst 8 is relatively decreased in a SOx release temperature range. The ECU 15 can also perform this control.

Figure 6:
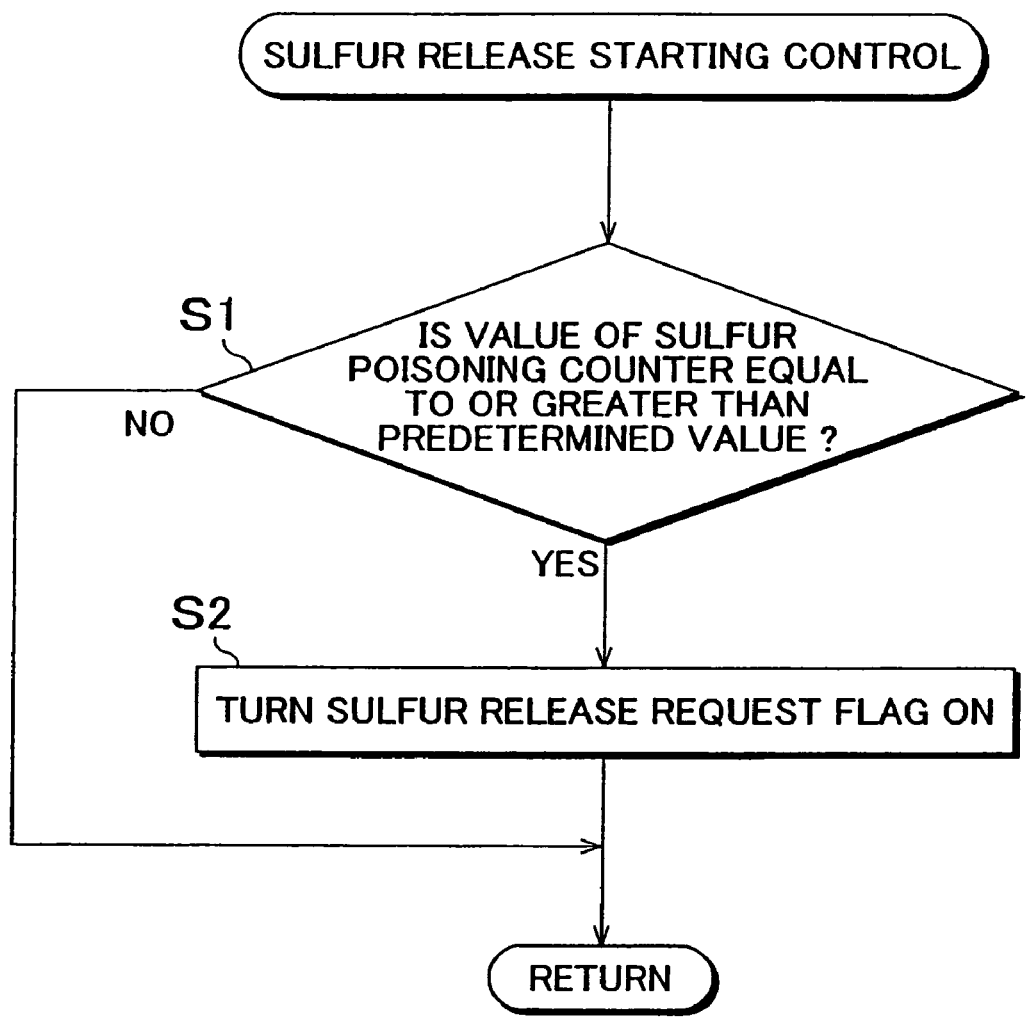
FIG. 6 is a flowchart showing a sulfur release starting control routine.

Next, referring to FIG. 6 to FIG. 9, description will be made of various control routines performed by the ECU 15 for the sulfur poisoning recovery process. FIG. 6 shows a sulfur release starting control routine for determining starting timing of the sulfur poisoning recovery process. The sulfur release starting control routine is performed by the ECU 15. This routine is repeatedly performed at appropriate time intervals while the engine 1 is operated. In the routine in FIG. 6, first, in step S1, the ECU 15 determines whether a value of a sulfur poisoning counter is equal to or greater than a predetermined value. The sulfur poisoning counter is provided for determining an amount of sulfur with which the NOx catalyst 8 is poisoned. The ECU 15 sequentially calculates the amount of SOx with which the NOx catalyst 8 is poisoned (hereinafter, referred to as "sulfur poisoning amount"), based on an amount of fuel injected from the fuel injection valve 16 and an estimated rate of the sulfur component contained in the fuel, by a separate routine. The sulfur poisoning counter accumulates the calculated values. The predetermined value used in step S1 is set as a threshold value for determining whether the SOx poisoning amount has increased to a level at which the sulfur poisoning recovery process needs to be performed. The amount of SOx in the exhaust gas may be detected using the SOx sensor disposed upstream of the NOx catalyst 8, and the sulfur poisoning amount in the NOx catalyst 8 may be determined by accumulating the detected amounts of SOx. In a case where a NOx sensor is provided at a portion downstream of the NOx catalyst 8, it may be determined that the sulfur poisoning recovery process needs to be performed by determining a degree of deterioration of the NOx catalyst 8 based on the concentration of NOx detected by the NOx sensor.

When the value of the sulfur poisoning counter is less than the predetermined value in step S1, the ECU 15 determines that SOx poisoning has not progressed to a level at which the sulfur poisoning recovery process needs to be performed, and ends the routine in FIG. 6. Meanwhile, when the value of the sulfur poisoning counter is equal to or greater than the predetermined value, the ECU 15 determines that the sulfur poisoning amount has reached a limit, and turns a sulfur release request flag on in step S2. Then, the ECU 15 ends the routine.

Figure 7:
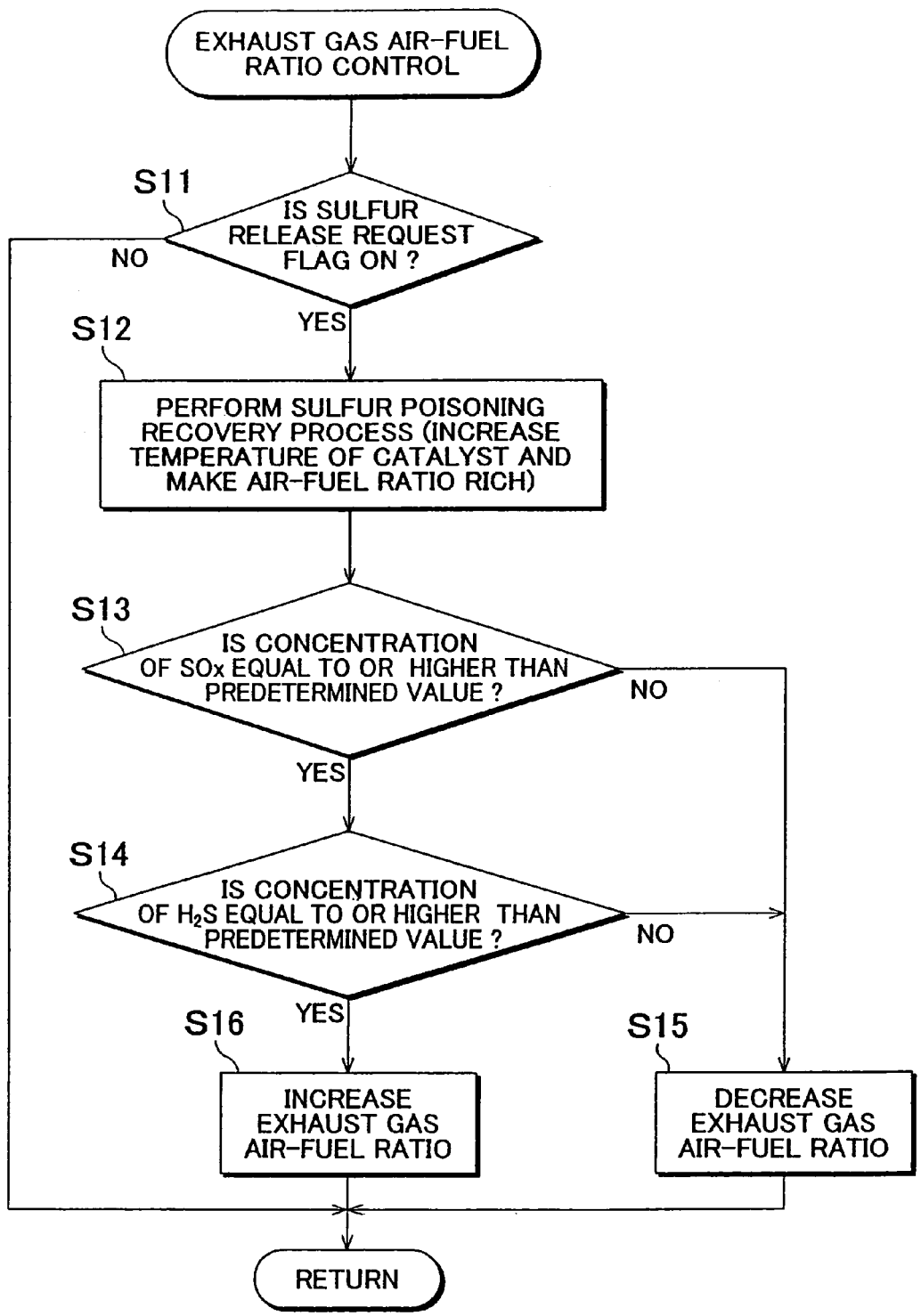
FIG. 7 is a flowchart showing an exhaust gas air-fuel ratio control routine.
Figure 8:
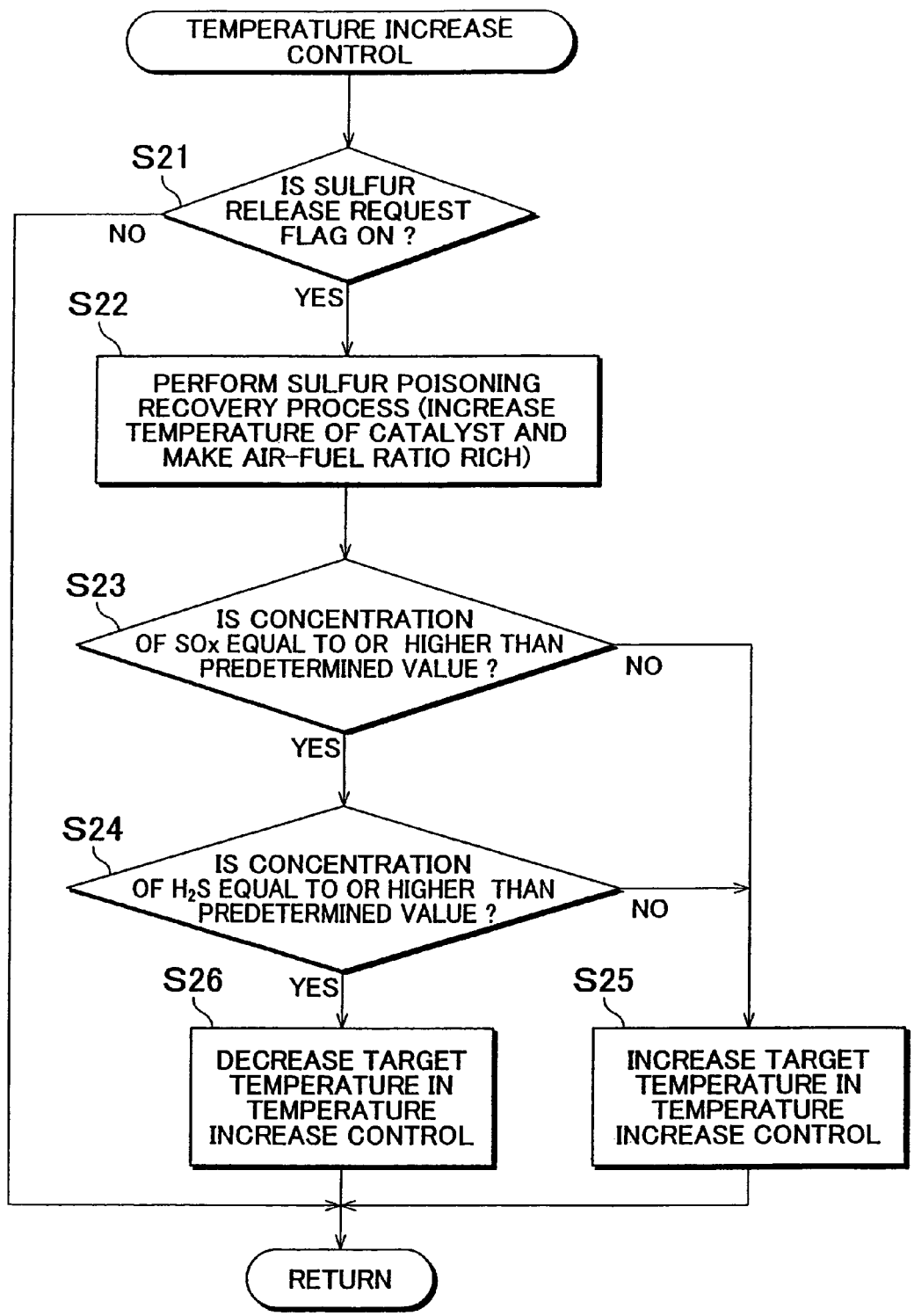
FIG. 8 is a flowchart showing a temperature increase control routine.

When the sulfur release request flag is turned on, in order to perform the sulfur poisoning recovery process, the ECU 15 repeatedly performs an exhaust gas air-fuel ratio control routine in FIG. 7 and a temperature increase control routine in FIG. 8 at given time intervals. In the exhaust gas air-fuel ratio control routine in FIG. 7, first, the ECU 15 determines whether the sulfur release request flag is on in step S11. When the sulfur release request flag is on, the ECU 15 performs step S12 and subsequent steps. When the sulfur release request flag is off, the ECU 15 skips step S12 and subsequent steps, and ends the present routine. In step S12, the operating state of the engine 1 is controlled such that the exhaust gas air-fuel ratio is maintained in a rich range (i.e., a range in which the fuel amount is larger than the fuel amount at the stoichiometric air-fuel ratio), and the temperature of the NOx catalyst 8 is increased to the SOx release temperature range, whereby the sulfur poisoning recovery process is performed. In a case where the sulfur poisoning recovery process has already been started, the sulfur poisoning recovery process continues to be performed. The exhaust gas air-fuel ratio is made rich, and the temperature of the NOx catalyst 8 is increased, for example, by additionally injecting fuel from the fuel injection valve 16 after performing main fuel injection for combustion in the cylinder 2, that is, by performing so-called post-injection. In a case where a fuel supply valve is provided upstream of the NOx catalyst 8 in the exhaust passage 4, the exhaust gas air-fuel ratio may be controlled to be in the rich range by supplying fuel from the fuel supply valve. The control of the operating state of the engine 1 is not limited to the control of combustion in the cylinder 2, but includes the aforementioned control in the exhaust passage 4.

After the sulfur poisoning recovery process is started in step S12, it is determined whether the concentration of SOx detected by the sulfur concentration sensor 10 is equal to or higher than a predetermined value in step S13. The predetermined value is set to a lowest SOx release level, which is the lowest level required for completing recovery of the NOx catalyst from sulfur poisoning by the sulfur poisoning recovery process in an appropriate period. When the concentration of SOx is lower than the predetermined value, the exhaust gas air-fuel ratio is decreased by a predetermined step amount in step S15. That is, the exhaust gas air-fuel ratio is changed to an air-fuel ratio at which the air amount is decreased as compared to the air amount at an air-fuel ratio before step S15 is performed. This change in the exhaust gas-air fuel ratio does not signify the change from the stoichiometric air-fuel ratio to a rich air-fuel ratio. The exhaust gas air-fuel ratio is decreased, for example, by operating the throttle valve 7 and the EGR valve 13 so that an amount of intake air (strictly speaking, an amount of oxygen) is decreased. Also, the exhaust gas air-fuel ratio may be decreased by increasing the amount of fuel supplied by the post injection.

When the concentration of SOx is equal to or higher than the predetermined value in step S13, it is determined whether the concentration of $H_2S$ detected by the sulfur concentration sensor 10 is equal to or higher than a predetermined value, that is, the concentration $H_2S$ that is obtained based on the difference between the electromotive force detected by the SOx concentration detection portion 20 and the electromotive force detected by the total concentration detection portion 21 is equal to or higher than the predetermined value in step S14. The predetermined value is set to the permissible level in FIG. 4. However, in order to prevent the concentration of $H_2S$ from temporarily becoming equal to or higher than the permissible level due to delay in response of the control, the predetermined value in step S14 may be set to be lower than the permissible level. When the concentration of $H_2S$ is lower than the predetermined value, the exhaust gas air-fuel ratio is decreased in step S15. Meanwhile, when the concentration of $H_2S$ is equal to or higher than the predetermined value, the exhaust gas air-fuel ratio is increased by a predetermined step amount in step S16. That is, the exhaust gas air-fuel ratio is changed to an air-fuel ratio at which the air amount is increased as compared to the air amount at an air-fuel ratio before step 16 is performed. This change in the exhaust gas-air fuel ratio does not signify the change from the stoichiometric air-fuel ratio to a lean air-fuel ratio. The exhaust gas air-fuel ratio is increased, for example, by operating the throttle valve 7 and the EGR valve 13 so that the amount of intake air is increased. Also, the exhaust gas air-fuel ratio may be increased by decreasing the amount of fuel supplied by the post injection. In a case where an air injection device for introducing air to the exhaust passage 4 is provided, for example, in order to promote warming-up of the NOx catalyst 8, the exhaust gas air-fuel ratio may be increased by introducing air into the exhaust passage 4 from the air injection device. After the exhaust gas air-fuel ratio is changed in step S15 or step S16, the present routine is ended.

Meanwhile, in the temperature increase control routine in FIG. 8, first, the ECU 15 determines whether the sulfur release request flag is on in step S21. When the sulfur release request flag is on, the ECU 15 performs step S22 and subsequent steps. When the sulfur release request flag is off, the ECU 15 skips step S22 and subsequent steps, and ends the present routine. In step S22, the operating state of the engine 1 is controlled such that the exhaust gas air-fuel ratio is maintained in the rich range, and the temperature of the NOx catalyst 8 is increased to the SOx release temperature range, whereby the sulfur poisoning recovery process is performed. The processes in step S21 and step S22 are the same as those in step S11 and step S12 in FIG. 7. In step S23, it is determined whether the concentration of SOx is equal to or higher than the predetermined value as in step S13 in FIG. 7. In step S24, it is determined whether the concentration of $H_2S$ is equal to or higher than the predetermined value as in step S14 in FIG. 7. The predetermined values used in step S23 and S24 are the same as the predetermined values used in step S13 and S14, respectively. When the concentration of SOx is lower than the predetermined value, or when the concentration of $H_2S$ is lower than the predetermined value, a target temperature in the temperature increase control for the NOx catalyst 8 is increased by a predetermined step amount in step S25. When the concentration of SOx is equal to or higher than the predetermined value and the concentration of $H_2S$ is equal to or higher than the predetermined value, the target temperature in the temperature increase control is decreased by a predetermined step amount. The ECU 15 controls the operating state of the engine 1 so that the temperature of the NOx catalyst 8 becomes equal to the target temperature in the SOx release temperature range by a separate routine during the sulfur poisoning recovery process. In the processes in step S25 and S26, the temperature of the NOx catalyst 8 is changed by changing the target temperature.

The temperature of the NOx catalyst 8 is adjusted, for example, by increasing or decreasing the amount of fuel supplied by the post injection. Naturally, as the amount of fuel is increased, the temperature of the catalyst is increased. Also, the temperature of the catalyst can be decreased by decreasing the amount of fuel supplied by the post injection. However, since the temperature of the NOx catalyst 8 is correlated with the temperature of the exhaust gas, for example, the temperature of the catalyst can be adjusted also by changing timing of the main injection for combustion in the cylinder 2 so as to change the temperature of the exhaust gas. In this case, when the fuel injection timing is retarded, the temperature of the catalyst is increased. When the retarded fuel injection timing is advanced to the original fuel injection timing, the temperature of the catalyst is decreased. After the target temperature of the catalyst is changed in step S25 or step S26, the present temperature increase control routine is ended.

Figure 9:
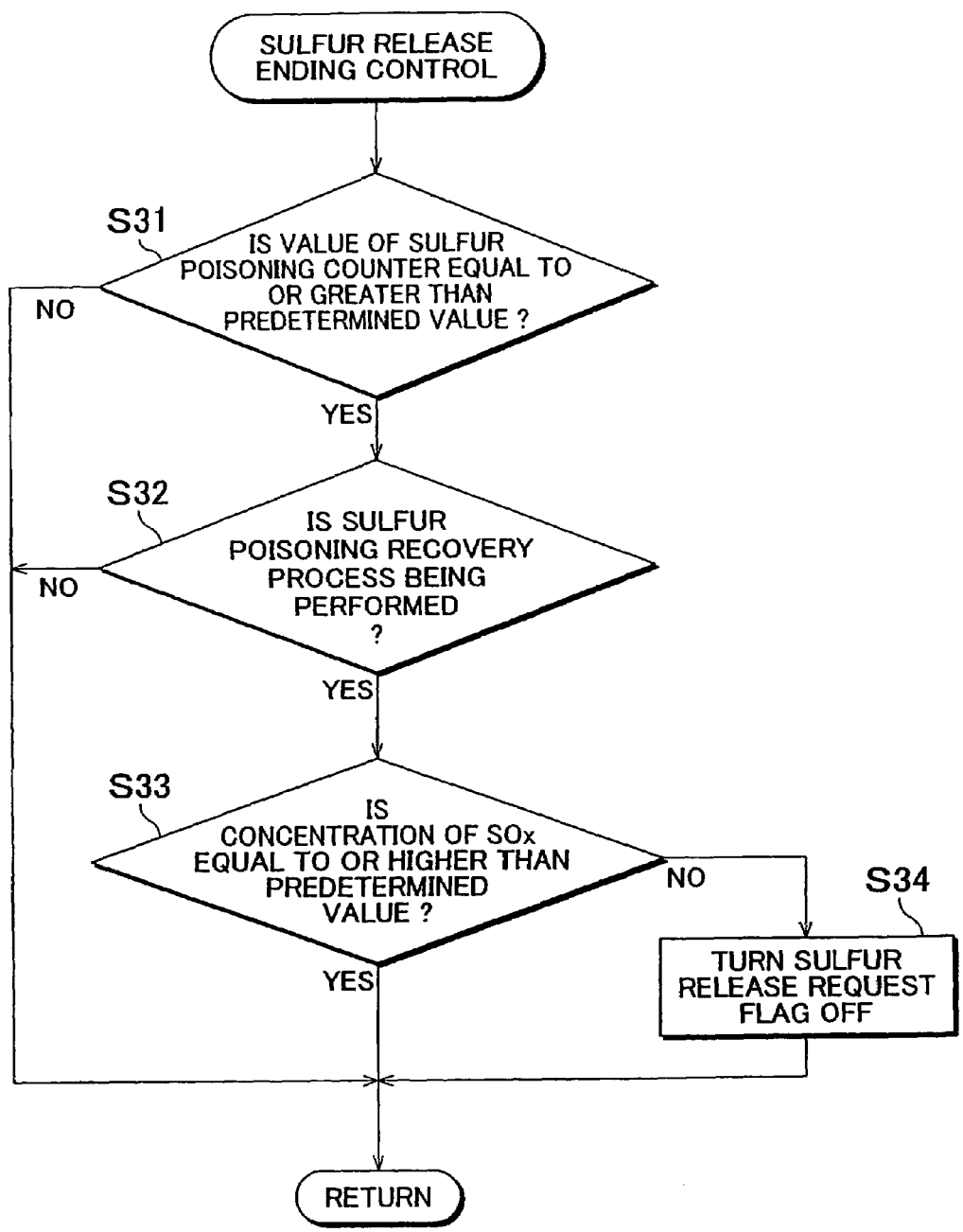
FIG. 9 is a flowchart showing a sulfur release ending control routine.

FIG. 9 shows a sulfur release ending control routine for determining ending timing of the sulfur poisoning recovery process. The sulfur release ending control routine is performed by the ECU 15. The routine is repeatedly performed at appropriate time intervals while the engine 1 is operated. In the routine in FIG. 9, first, the ECU 15 determines whether the value of the sulfur poisoning counter is equal to or greater than the predetermined value in step S31. The predetermined value used in step S31 is the same as the predetermined value used in step S1 in FIG. 6. When the value of the sulfur poisoning counter is equal to or greater than the predetermined value, the ECU 15 performs step S32 and subsequent steps. When the value of the sulfur poisoning counter is less than the predetermined value, the ECU 15 skips step S32 and subsequent steps, and ends the present routine. In step S32, it is determined whether the sulfur poisoning recovery process is being performed. When the sulfur poisoning recovery process is being performed, the ECU 15 performs step S33. When the sulfur poisoning recovery process is not being performed, the ECU 15 skips step S33 and subsequent steps, and ends the present routine.

In step S33, it is determined whether the concentration of SOx detected by the sulfur concentration sensor is equal to or higher than a predetermined value. The predetermined value used in step S33 is set as a threshold value for determining whether the sulfur poisoning recovery process should be ended. The predetermined value used in step S33 is set to be smaller than the predetermined value used in step S13 in FIG. 7, and the predetermined value used in step S23 in FIG. 8 so that the sulfur poisoning recovery process is not ended even when SOx is released at the lowest level required for causing the sulfur poisoning recovery process to proceed. When it is determined that the concentration of SOx is lower than the predetermined value in step S33, the sulfur release request flag is turned off in step S34, and the present routine is ended. When it is determined that the concentration of SOx is equal to or higher than the predetermined value in step S33, step S34 is skipped, and the routine is ended.

Since the control that has been described is performed, when the amount of released SOx during the sulfur poisoning recovery process has decreased to the lowest level required for the sulfur poisoning recovery process, the exhaust gas air-fuel ratio is decreased by the processes in step S13 and step S15 in FIG. 7, and the temperature of the catalyst is increased in the processes in step S23 and step S25 in FIG. 8. Accordingly, SOx is released from the NOx catalyst 8 at the lowest required level during the sulfur poisoning recovery process, and thus the sulfur poisoning recovery process reliably proceeds. Also, when the concentration of $H_2S$ is equal to or lower than the permissible level, the processes in step S14 and step S15 in FIG. 7 are repeatedly performed, whereby the exhaust gas air-fuel ratio is gradually decreased. In addition, the processes in step S24 and step S25 in FIG. 8 are repeatedly performed, whereby the temperature of the catalyst is gradually increased. Meanwhile, when the concentration of $H_2S$ has increased to the permissible level (permissible limit), the processes in step S14 and step S16 in FIG. 7 are performed, whereby the exhaust gas air-fuel ratio is increased to some degree. In addition, the processes in step S24 and step S26 in FIG. 8 are performed, whereby the temperature of the catalyst is decreased to some degree. Thus, the sulfur poisoning recovery process can be caused to proceed efficiently by promoting release of SOx from the NOx catalyst 8 as much as possible while the concentration of $H_2S$ is controlled to be equal to or lower than the permissible level.

Figure 10A:
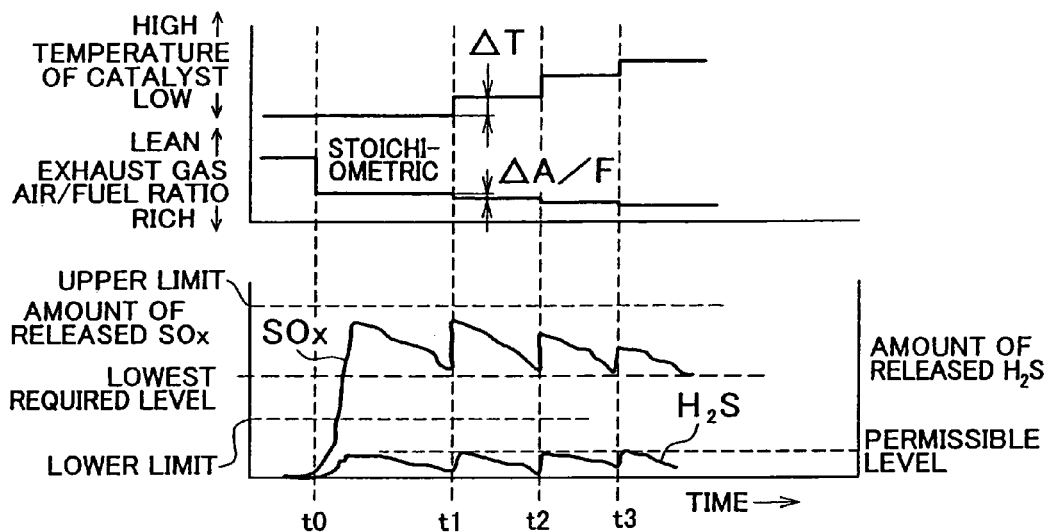
FIGS. 10A and 10B are graphs each showing time-dependent changes in an amount of released SOx and an amount of generated $H_2S$ during a sulfur poisoning recovery process, and more specifically.
Figure 10B:
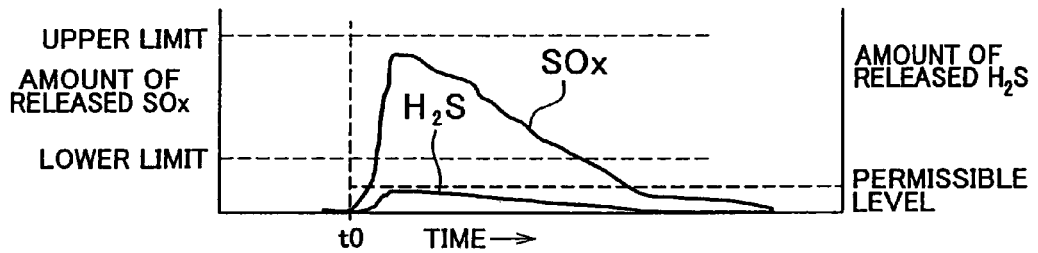

FIG. 10A shows time-dependent changes in the temperature of the catalyst, the exhaust gas air-fuel ratio, the amount of released SOx, and the amount of generated $H_2S$ in a case where the controls shown in FIG. 7 and in FIG. 8 are performed. FIG. 10B shows time-dependent changes in the amount of released SOx and the amount of generated $H_2S$ in a comparative case where the controls shown in FIG. 7 and FIG. 8 are not performed, and the exhaust gas air-fuel ratio and the temperature of the catalyst are set so that SOx is released and the amount of generated $H_2S$ does not exceed the permissible level at a time (t0) at which the sulfur poisoning recovery process is started, and subsequently the exhaust gas air-fuel ratio and the temperature of the catalyst are controlled to be constant. In the comparative example in FIG. 10B, though SOx is sufficiently released in an initial stage of the sulfur poisoning recovery process, the amount of released SOx becomes lower than the lowest required level in the midst of the sulfur poisoning recovery process, and subsequently SOx is hardly released. However, the sulfur poisoning recovery process continues. Meanwhile, in the example shown in FIG. 10A, the sulfur poisoning recovery process is started at time t0, the amount of released SOx decreases to the lowest required level (equivalent to the predetermined value used in step S13 in FIG. 7 and in step S23 in FIG. 8) at time t1, at time t2, and at time t3. Therefore, the exhaust gas air-fuel ratio is decreased by a predetermined change amount ΔA/F, and the temperature of the catalyst is increased by a predetermined change amount ΔT. Since the exhaust gas air-fuel ratio and the temperature of the catalyst are changed in the aforementioned manner, the amount of released SOx is increased, and the amount of generated $H_2S$ is increased. However, the exhaust gas air-fuel ratio and the temperature of the catalyst are adjusted so that the amount of generated $H_2S$ does not exceed the permissible level. Though changes in the exhaust gas air-fuel ratio and the temperature of the catalyst, which are caused by this adjustment, are not shown in FIG. 10A, the amount of released SOx is maintained at the lowest required level or higher, while the amount of generated $H_2S$ is reduced to be equal to or lower than the permissible level, due to the adjustment. Thus, the sulfur poisoning recovery process can be performed efficiently.

In the aforementioned embodiment, the ECU 15 functions as the poisoning recovery control means.

The invention is not limited to the aforementioned embodiment. The invention can be realized in various embodiments. For example, in order to control the concentration of SOx and the concentration of $H_2S$ to values in the range A1 in FIG. 4 during the sulfur poisoning recovery process, only one of the controls in FIG. 7 and FIG. 8 may be performed. In step S14 in FIG. 7 and in step S24 in FIG. 8, when the concentration of $H_2S$ is lower than the predetermined value, the routine may be ended without performing step S15 or step S25.

Figure 11:
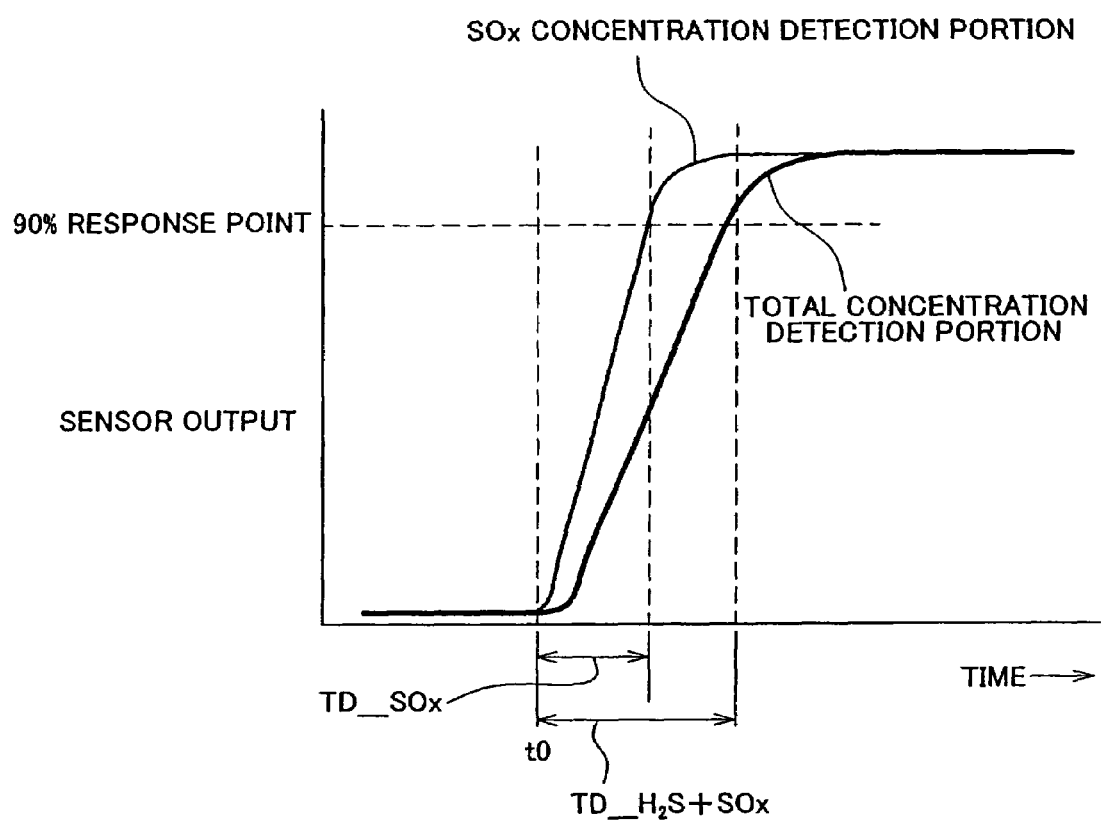
FIG. 11 shows response characteristics of the SOX concentration detection portion and the total concentration detection portion of the sulfur concentration sensor.

In the aforementioned embodiment, in the sulfur concentration sensor 10, the SOx concentration detection portion 20 detects the concentration of SOx, and the total concentration detection portion 21 detects the total concentration simultaneously. However, the sulfur concentration sensor 10 may be configured such that the concentration of SOx and the total concentration are detected alternately at appropriate time intervals. In this case, the oxygen ion conductor 22, the sub-electrode 23, the detection electrode 24, and the reference electrode 25 may be commonly used by the SOx concentration detection portion 20 and the total concentration detection portion 21. Whether the oxidation catalyst 27B oxidizes $H_2S$ or not may be changed at given time intervals. Also, in the sulfur concentration sensor 10, it takes a longer time to complete the oxidation reaction, particularly the oxidation reaction of $H_2S$ in the oxidation catalyst 27B of the total concentration detection portion 21, than to complete the oxidation reaction in the oxidation catalyst 27A of the SOx concentration detection portion 20. In addition, since only SOx is oxidized in the catalyst 27A, but both of SOx and $H_2S$ need to be oxidized in the catalyst 27B, it takes a longer time to complete the oxidation reaction in the catalyst 27B. Further, in the case where the capacity of the catalyst 27B is set to be larger than the capacity of the catalyst 27A, it takes a longer time for the exhaust gas to pass through the catalyst 27B, than for the exhaust gas to pass through the catalyst 27A, since the catalyst 27B has larger capacity than the capacity of the catalyst 27A. For these reasons, for example, as shown in FIG. 11, as compared to a response delay period of sensor output in the SOx concentration detection portion 20, for example, a period TD_SOx from time t0 at which detection is started until a 90% response point is reached, a response delay period TD_H$_2$S+SOx in the total concentration detection portion 21 may be increased according to a difference between the time required for completing the oxidation reaction in the SOx concentration detection portion 20 and the time required for completing the oxidation reaction in the total concentration detection portion 21. In the case where such response delay occurs, the output determination may be performed by the total concentration detection portion 21 later than the output determination performed by the SOx concentration detection portion 20 by a difference between the response delay periods thereof, and the concentration of H$_2$S may be detected based on the difference between the electromotive force generated in the SOx concentration detection portion 20 and the electromotive force generated in the total concentration detection portion 21.

The determination as to the ending timing of the sulfur poisoning recovery process is not limited to the determination shown in FIG. 9. For example, it is determined that the sulfur poisoning recovery process should be ended based on the concentration of SOx in step S33. However, it may be determined that the sulfur poisoning recovery process should be ended when the total concentration detected by the total concentration detection portion 21 has decreased to be lower than a predetermined value. Also, the ECU 15 may repeatedly calculate the amount of SOx released from the NOx catalyst 8 based on the detected value of the concentration of SOx or the total concentration, and may accumulate the calculated values to obtain an accumulated value from when the sulfur poisoning recovery process is started, and may determine that the sulfur poisoning recovery process should be ended when a difference between the accumulated value and the value of the sulfur poisoning counter becomes less than a predetermined value. Further, the invention is not limited to a diesel engine. The invention can be applied to various internal combustion engines using gasoline and other fuels.

The invention claimed is:

1. An exhaust gas control method for an internal combustion engine, comprising:

performing a poisoning recovery process that controls an operating state of an internal combustion engine such that sulfur oxide is released from a NOx storage reduction catalyst provided in an exhaust passage for the internal combustion engine, detecting a total concentration of sulfur oxide and hydrogen sulfide in exhaust gas that has passed through the NOx storage reduction catalyst during the poisoning recovery process;

detecting a concentration of the sulfur oxide in the exhaust gas that has passed through the NOx storage reduction catalyst during the poisoning recovery process;

calculating a concentration of the hydrogen sulfide based on the total concentration and the concentration of the sulfur oxide that are detected;

controlling at least one exhaust gas that flows into the NOx storage reduction catalyst and a state of the NOx storage reduction catalyst such that the sulfur oxide is released from the NOx storage reduction catalyst, an amount of the released sulfur oxide is in a predetermined range, and the concentration of the hydrogen sulfide is reduced when the concentration of the hydrogen sulfide exceeds a permissible limit, and controlling the operating state of the internal combustion engine such that, when the concentration of the hydrogen sulfide exceeds the permissible limit, the amount of the sulfur oxide released from the NOx storage reduction catalyst is equal to or larger than a lower limit value of the predetermined range, and the concentration of the hydrogen sulfide is equal to or lower than the permissible limit.

2. An exhaust gas control apparatus for an internal combustion engine, comprising:

a NOx storage reduction catalyst which is provided in an exhaust passage for an internal combustion engine;

a detection device which detects a total concentration of sulfur oxide and hydrogen sulfide in exhaust gas that has passed through the NOx storage reduction catalyst, and a concentration of the sulfur oxide in the exhaust gas; and a poisoning recovery control device which performs a poisoning recovery process that controls an operating state of the internal combustion engine such that the sulfur oxide is released from the NOx storage reduction catalyst, wherein when a concentration of the hydrogen sulfide obtained based on the total concentration and the concentration of the sulfur oxide that are detected by the detection device during the poisoning recovery process exceeds a permissible limit, the poisoning recovery control device controls the operating state of the internal combustion engine such that the sulfur oxide is released from the NOx storage reduction catalyst, an amount of the released sulfur oxide is in a predetermined range, and the concentration of the hydrogen sulfide is reduced, and when the concentration of the hydrogen sulfide exceeds the permissible limit, the poisoning recovery control device controls the operating state of the internal combustion engine such that the amount of the sulfur oxide released from the NOx storage reduction catalyst is equal to or larger than a lower limit value of the predetermined range, and the concentration of the hydrogen sulfide is equal to or lower than the permissible limit.

3. The apparatus according to claim 2, wherein when the concentration of the sulfur oxide detected by the detection device has decreased to a predetermined lower limit value, the poisoning recovery control device controls the operating state of the internal combustion engine such that the amount of the released sulfur oxide is increased.

4. The apparatus according to claim 2, wherein the poisoning recovery control device controls the operating state of the internal combustion engine such that the concentration of the hydrogen sulfide is reduced, by performing at least one of a process of increasing an exhaust gas air-fuel ratio in a rich air-fuel ratio range, and a process of decreasing a temperature of the NOx storage reduction catalyst in a temperature range in which the sulfur oxide is released.

5. The apparatus according to claim 4, wherein the poisoning recovery control device increases the exhaust gas air-fuel ratio by performing at least one of a process of increasing an amount of intake air, a process of decreasing an EGR amount, and a process of decreasing an amount of fuel supplied to a portion upstream of the NOx storage reduction catalyst.

6. The apparatus according to claim 2, wherein when the concentration of the hydrogen sulfide is lower than the permissible limit, the poisoning recovery control device controls the operating state of the internal combustion engine such that the amount of the sulfur oxide released from the NOx storage reduction catalyst is increased.

7. The apparatus according to claim 6, wherein the poisoning recovery control device controls the operating state of the internal combustion engine such that the amount of the released sulfur oxide is increased, by performing at least one of a process of decreasing an exhaust gas air-fuel ratio, and a process of increasing a temperature of the NOx storage reduction catalyst.

8. The apparatus according to claim 7, wherein the poisoning recovery control device decreases the exhaust gas air-fuel ratio by performing at least one of a process of decreasing an amount of intake air, a process of increasing an EGR amount, and a process of increasing an amount of fuel supplied to a portion upstream of the NOx storage reduction catalyst.

* * * * *

UNITED STATES PATENT AND TRADEMARK OFFICE
CERTIFICATE OF CORRECTION

PATENT NO.       : 7,509,801 B2                                           Page 1 of 1
APPLICATION NO.  : 10/560733
DATED            : March 31, 2009
INVENTOR(S)      : Takamitsu Asanuma It is certified that error appears in the above-identified patent and that said Letters Patent is hereby corrected as shown below:

Title page, column 1, Item (22) should read

--(22)  PCT Filed
   Jun. 9, 2005--

Signed and Sealed this

Twenty-first Day of July, 2009

JOHN DOLL
*Acting Director of the United States Patent and Trademark Office*